United States Patent [19]

Eisenmann

[11] 3,772,190

[45] Nov. 13, 1973

[54] METHOD FOR PURIFYING WATER

[75] Inventor: Rolf Eisenmann, Stuttgart-Weilimdorf, Germany

[73] Assignee: Otto Durr K.G., Stuttgart-Zuffenhausen, Germany

[22] Filed: Oct. 8, 1971

[21] Appl. No.: 187,752

[30] Foreign Application Priority Data
Oct. 15, 1970 Germany............... P 20 50 635.8

[52] U.S. Cl..................... 210/44, 210/60, 210/201, 210/255
[51] Int. Cl............................................. B03d 1/00
[58] Field of Search................. 210/44, 221, 201, 210/195, 252, 255, 60, 61

[56] References Cited
UNITED STATES PATENTS
2,778,499  1/1957  Chamberlain et al. ........... 210/44 X
3,249,533  5/1966  Fowler................................. 210/44

Primary Examiner—Michael Rogers
Attorney—Michael S. Striker

[57] ABSTRACT

A method for purifying polluted water by adding compressed air and intimately mixing it by circulation in a first operating stage so as to form a foamy mixture, then allowing the foam to float to the surface of the water and removing the foam and thereby partly cleaning the water, then subjecting the partly clean water to a second operating stage in which compressed air is again added to the water and the mixture is again thoroughly circulated and intimately mixed to produce a foam, and the foam is again allowed to float to the surface of the water, and then removing all of the foam from the cleaned water.

6 Claims, 1 Drawing Figure

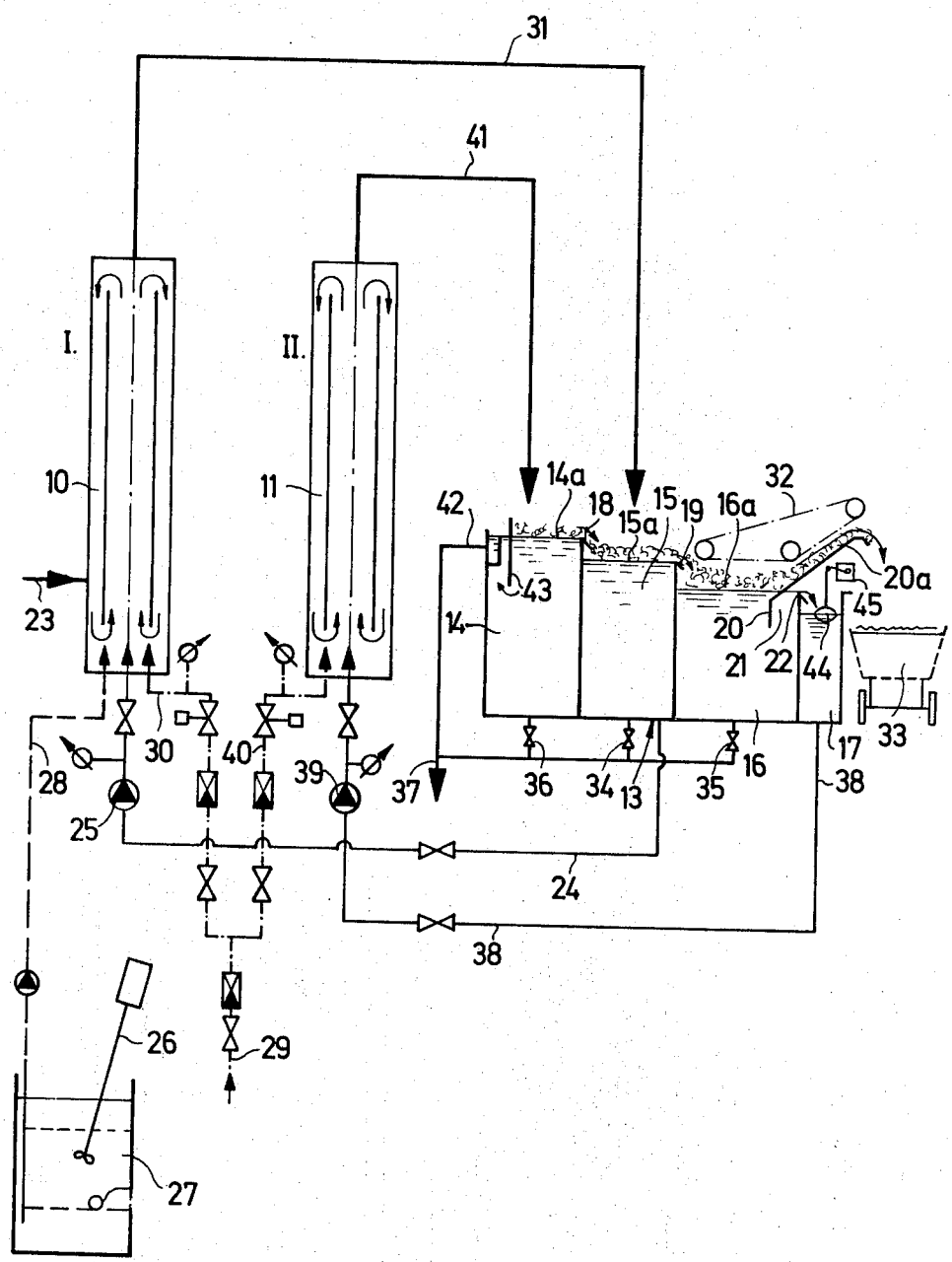

METHOD FOR PURIFYING WATER

The present invention relates to a method and an apparatus for purifying water and more particularly for separating particles of paint, enamel or the like from the wash water of electrophoresis painting apparatus by mixing the polluted water with air so as to produce a foam, for example, a paint foam, and by subjecting the foamy mixture to a separating process in which the paint or other undesired substance is removed from the water. More particularly, the present invention relates to improvements of the method and apparatus as disclosed in my copending U.S. Pat. application Ser. No. 59,132, filed on July 29, 1970.

It is an object of the present invention to provide a method for carrying out the separating process as thoroughly as possible so that the water which has been separated from the mixture will have as high a degree of purity as possible.

It is another object of the invention to carry out the new method as economically as possible.

A further object of the invention consists in the provision of an apparatus of a very simple and compact construction for carrying out the inventive method.

An essential feature of this invention therefore consists in subjecting the polluted watery mixture to a first separating stage for partly purifying the water and in then subjecting the outcome of this first stage to a second stage in which the water is again thoroughly mixed with air and frequently recirculated and again separated from the impurities.

By mixing the polluted water with air and again mixing this mixture thoroughly, preferably in a circulating chamber, the foreign particles, especially paint particles, of which a small amount is still contained in the water are again converted into a foam. While in the first stage of the process the mixture is mixed and circulated while a coagulant is added, the second stage of the process may be carried out without adding any coagulant.

According to a preferred embodiment of the invention, the foam which is produced in the separating process of the second operating stage is supplied to the foam which is produced in the first operating stage by overflowing from one container to another and thereafter the entire foam is removed from the liquid even though the new apparatus requires two operating stages, this apparatus may be made of a relatively simple and inexpensive structure. The separating container of the second stage is preferably located at a higher level than that of the first stage and connected by an overflow with the latter.

After the water has been finally cleaned, it may be discharged from the separating container of the second stage, for example, over a dam or overflow.

These as well as additional features and advantages of the present invention will hereafter be described in greater detail with reference to the accompanying diagrammatic drawing of a preferred embodiment thereof which, however, is not to be regarded as a limitation of the invention.

In this drawing, the first stage I of the process is carried out in a mixing apparatus 10, preferably in the form of a circulating container, while the second stage II of the process is likewise carried out in a mixing apparatus 11 which preferably also consists of a circulating container. The numeral 13 generally indicates the separating and calming unit in the form of four adjacent containers 14, 15, 16 and 17 the upper edges of which have different levels so that a part of the contents and especially the foam of the first container 14 which has the highest liquid level 14a can flow over an overflow 18 into the next container 15 which has a medium liquid level 15a, and from the latter over an overflow 19 into the next container 16 which has the lowest liquid level 16a. The upper part of this last-mentioned container 16 is provided with a partition 20 from which a ramplike wall 20a ascends over which the foam is finally discharged from the apparatus. Due to this partition 20, a foamless chamber 21 is formed in the container 16 from which the partly purified water may flow over an overflow 22 into the next container 17.

The impure mixture of water and paint or enamel is first supplied through a line 23 to the mixer 10 of the first stage, preferably a circulating container, into the lower end of which the water which has previously been partly purified in the container 15 is supplied through a line 24 by means of a pump 25 so as to form a driving jet which has an injector effect. The mixing container 10 is further supplied through a line 28 with the coagulant from a container 27 which may be provided, for example, with a stirrer 26, and through a line 29, 30 in which check valves are provided, compressed air is also passed into the container for producing the foam. Due to the injector effect, the mixture of water, paint or enamel, coagulant and compressed air is thus circulated frequently in the mixing container 10 and the ingredients of this mixture are thus thoroughly mixed with each other and whipped up to a foam.

The foamy mixture is then conducted from the container 10 through a line 31 to the container 15 in which the first separation of this mixture takes place. The foamy mixture of water and paint which is then deposited on the surface of the water in the container 15 will then flow over the overflow 19 into the next container 16 in which a further separation of water and foam takes place. The foam may then be wiped or stripped off the surface 16a of the water in the container 16, for example, by means of a conveyer belt which is provided with wipers (not shown) which push the foam over the ramp 20a from which the foam will then drop into a lorry or other vehicle 33.

For emptying the containers 15 and 16 and also the container 14, these containers are provided with discharge valves 34, 35 and 36 which are connected to a common discharge line 37.

Since a purifying process as above described which is similar to that as disclosed in my earlier application referred to in the first paragraph of this specification is often not sufficient for attaining a degree of purity of the water which is satisfactory or as high as desirable, the present invention provides an additional purifying stage which is carried out as follows: After being separated from the paint foam, for example, in the container 16, and after passing through the chamber 21 into the last container 17, the water which still contains particles of paint or enamel is conducted under pressure, preferably by means of a pump 39, through a line 38 to the mentioned mixing apparatus 11 of the second stage II. Thus, the water which is supplied from the container 44 through the line 38 is thoroughly mixed with compressed air in the apparatus 11 by being circulated numerous times therein. The compressed air may for this purpose be supplied to the mixing apparatus 11 from the line 29 through a branch line 40 which is controlled by valves or similar means. The forced circulation of the mixture of water and compressed air in the mixing apparatus 11 is again produced by an injector effect similarly as in the apparatus 10. In this case it is, however, usually not necessary to supply the apparatus 11 with a coagulant, although if desired this may also be done, for example, through a line, not shown, from the container 27.

The foamy mixture of water and paint or enamel which is formed in the second stage is conducted through a line 41 to the container 14 in which another separation of the foam from the water is carried out. Since the surface of the liquid in this container 14 has a lever 14a which is higher than the level 15a of the liquid in the following container 15, the foam can flow over the overflow 18 into this container 15 and can then pass together with the foam formed in this container over the overflow 19 into the following container 16 in which all of the foam is separated from the liquid.

From the upper part of the container 14 in which the water has already reached a high degree of purity this water passes over an overflow 42 which is located at a slightly lower level than the overflow 18 and is screened by a suitable screen 43 from the foam which floats on the surface 14a of the liquid in the container 14. From the overflow 42 the purified water finally passes out of the apparatus through the discharge line 37.

In order to insure that the amount of the partly purified water which passes back into the circulating apparatus through the line 38 equals as accurately as possible the amount of paint-polluted water which is supplied to the apparatus through the line 23, a float element 44 is provided in the container 17. This float element 44 is connected to a switch 45 and is adapted to control the flow of water through the line 38 in accordance with the level of the water in the container 17, for example, by varying the operation of the pump 39.

The present invention is also applicable to the apparatus as described with reference to FIGS. 2 to 4 of my previous application referred to in the first paragraph of the present specification. The separating container should in this case be disposed concentrically to each other, while the circulating containers or mixers of both stages may be disposed, for example, above each other or side by side within the center of the circular plant and may have a rectangular or any other desirable cross-sectional shape.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A method of purifying water which is polluted with a foreign substance to remove the foreign substance therefrom which comprises passing the polluted water into a first mixing container and injecting compressed air thereinto to produce an injector effect and circulation of the polluted water in the said first mixing container and thereby whip up a foam therein, passing the said mixture of foam and polluted water into a first separating container in such a manner that the effects of the circulatory movement of the mixture in the first mixing container are not transmitted to the contents of the first separating container, permitting the mixture to settle and the foam to collect at the surface of the water in the first separating container, separating the thus-collected foam from the surface of the water in the first separating chamber and withdrawing and passing the water therefrom into a second mixing container, injecting compressed air thereinto to produce an injector effect and circulation of the said water in the said second mixing container and whip up a foam therein, passing the said mixture of foam and water into a second separating container in such a manner that the effects of the circulatory movement of the mixture in the second mixing container are not transmitted to the contents of the second separating container, permitting the mixture to settle and the foam to collect at the surface of the water in the second separating container, and separating the thus-collected foam from the surface of the water in the second separating container.

2. A method as defined in claim 1 in which a coagulating agent is added to the polluted water in the first mixing container.

3. A method as defined in claim 1 in which water from the first separating container is recirculated under pressure into the one of the two mixing containers to produce an additional injector effect therein.

4. A method as defined in claim 1 in which the foams that are separated in the first and second separating containers are simultaneously withdrawn from the separating containers.

5. A method as defined in claim 1 in which the foam collected at the surface of the water in the second separating container is moved toward and combined with the foam from the first separating container solely under the influence of gravitational forces.

6. A method as defined in claim 1 in which the foreign substance that is removed from the polluted water is a paint, enamel or similar foreign substance.

* * * * *